(12) United States Patent
Gao

(10) Patent No.: US 10,976,533 B2
(45) Date of Patent: Apr. 13, 2021

(54) TILING LIGHT SHEET SELECTIVE PLANE ILLUMINATION MICROSCOPY USING DISCONTINUOUS LIGHT SHEETS

(71) Applicant: INTELLIGENT IMAGING INNOVATIONS, INC., Denver, CO (US)

(72) Inventor: Liang Gao, Denver, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 106 days.

(21) Appl. No.: 16/273,620

(22) Filed: Feb. 12, 2019

(65) Prior Publication Data

US 2019/0250391 A1 Aug. 15, 2019

Related U.S. Application Data

(60) Provisional application No. 62/629,405, filed on Feb. 12, 2018.

(51) Int. Cl.
*G02B 21/06* (2006.01)
*G02B 21/00* (2006.01)

(52) U.S. Cl.
CPC .......... *G02B 21/06* (2013.01); *G02B 21/006* (2013.01); *G02B 21/0032* (2013.01); *G02B 21/0076* (2013.01)

(58) Field of Classification Search
CPC .... G02B 21/06; G02B 21/367; G02B 21/006; G02B 21/0032; G02B 21/0076; G02B 27/58; G02B 21/0036
See application file for complete search history.

(56) References Cited

U.S. PATENT DOCUMENTS

| | | |
|---|---|---|
| 4,818,983 A | 4/1989 | Hara et al. |
| 5,729,245 A | 3/1998 | Gove et al. |
| | (Continued) | |

FOREIGN PATENT DOCUMENTS

| | | |
|---|---|---|
| EP | 1538470 A2 | 6/2005 |
| GB | 2416405 | 1/2006 |
| | (Continued) | |

OTHER PUBLICATIONS

Office Action for U.S. Appl. No. 15/015,494, dated Aug. 12, 2019.
(Continued)

*Primary Examiner* — Wen Huang
(74) *Attorney, Agent, or Firm* — Jason H. Vick; Sheridan Ross, PC

(57) ABSTRACT

Tiling light sheet selective plane illumination microscopy (TLS-SPIM) improves the 3D imaging ability of SPIM by using a real-time optimized tiling light sheet. However, the imaging speed decreases, and size of the raw image data increases proportionally to the number of tiling positions in TLS-SPIM. The decreased imaging speed and the increased raw data size could cause significant problems when TLS-SPIM is used to image large specimens at high spatial resolution. An exemplary aspect solves this problem. Discontinuous light sheets created by scanning coaxial beam arrays synchronized with camera exposures are used for 3D imaging to decrease the number of tiling positions required at each image plane without sacrificing the spatial resolution. One exemplary aspect investigates the performance of the method via numerical simulation and discuss the details thereof.

18 Claims, 11 Drawing Sheets

(56) References Cited

U.S. PATENT DOCUMENTS

| | | | |
|---|---|---|---|
| 5,914,802 | A | 6/1999 | Stappaerts et al. |
| 6,028,306 | A | 2/2000 | Hayashi |
| 6,248,988 | B1 | 6/2001 | Krantz |
| 6,522,441 | B1 | 2/2003 | Rudeen |
| 8,922,887 | B2 | 12/2014 | Cooper |
| 9,134,519 | B2 | 9/2015 | Berman |
| 9,952,418 | B2 | 4/2018 | Redford |
| 2003/0021016 | A1 | 1/2003 | Grier |
| 2004/0008397 | A1 | 1/2004 | Noonan |
| 2004/0047030 | A1 | 3/2004 | MacAulay |
| 2005/0110998 | A1 | 5/2005 | Lin et al. |
| 2007/0195406 | A1 | 8/2007 | Wood |
| 2008/0068709 | A1 | 3/2008 | Zimmermann et al. |
| 2008/0273196 | A1 | 11/2008 | Fairley et al. |
| 2009/0116518 | A1 | 5/2009 | Patel et al. |
| 2009/0268280 | A1 | 10/2009 | Osawa et al. |
| 2009/0303571 | A1 | 12/2009 | Sandstrom |
| 2010/0111768 | A1 | 5/2010 | Banerjee et al. |
| 2011/0069382 | A1 | 3/2011 | Toomre et al. |
| 2011/0109958 | A1 | 5/2011 | Yokoi |
| 2011/0267663 | A1 | 11/2011 | Murayama |
| 2012/0135535 | A1 | 5/2012 | Grier et al. |
| 2014/0104681 | A1 | 4/2014 | Berman |
| 2014/0254005 | A1 | 9/2014 | Lippert et al. |
| 2014/0295413 | A1 | 10/2014 | Cohen et al. |
| 2014/0368904 | A1 | 12/2014 | Moertelmaier et al. |
| 2015/0168732 | A1 | 6/2015 | Singer et al. |
| 2015/0286042 | A1 | 10/2015 | Hilbert et al. |
| 2016/0231550 | A1 | 8/2016 | Redford |
| 2019/0025563 | A1 | 1/2019 | Fahrbach et al. |

FOREIGN PATENT DOCUMENTS

| | | |
|---|---|---|
| WO | WO 2013/053454 | 4/2013 |
| WO | WO 2013/130077 | 9/2013 |
| WO | WO 2014/005682 | 1/2014 |
| WO | WO 2016/138003 | 9/2016 |
| WO | WO 2017/060506 | 4/2017 |

OTHER PUBLICATIONS

Office Action for U.S. Appl. No. 15/015,494, dated Feb. 28, 2020.
Baumgart, Eugen et al. "Scanned Light Sheet Microscopy with Confocal Slit Detection" Optics Express; vol. 20; No. 19; Sep. 10, 2012.
Chen, Bi-Chang et al. "Lattice Light-Sheet Microscopy: Imaging Molecules to Embryos at High Spatiotemporal Resolution" Science; vol. 346; Issue 6208; Oct. 24, 2015.
Chhetri, Raghav R., et al, "Whole-Animal Functional and Developmental Imaging with Isotropic Spatial Resolution" Nature Methods; vol. 12, No. 12; Dec. 2015.
Chmielewski, Aleksander K. et al. "Fast Imaging of Live Organisms with Sculpted Light Sheets" Scientific Reports; vol. 5, No. 9385; Apr. 20, 2015.
Dean, Kevin M. et al. "Deconvolution-Free Subcellular Imaging with Axially Swept Light Sheet Microscopy" Biophysical Journal, vol. 108, 2807-2815; Jun. 2015.
Fahrbach, Florian O. et al. "Microscopy with Self-Reconstructing Beams" Nature Photonics; Sep. 12, 2010.
Fu, Qinyi et al. "Imaging Multicellular Specimens with Real-Time Optimized Tiling Light-Sheet Selective Plane Illumination Microscopy" Nature Communications; vol. 7:11088; Mar. 23, 2016.
Gao, Liang et al. "3D Live Fluorescence Imaging of Cellular Dynamics using Bessel Beam Plane Illumination Microscopy" Nature America, Inc,; vol. 9, No. 5; pp. 1083-1101; Apr. 10, 2014; 19 pages.
Gao, Liang Extend the Field of View of Selective Plan Illumination Microscopy by Tiling the Excitation Light Sheet; Optics Express; vol. 23, No. 5; pp. 6102-6111; Feb. 26, 2015.
Gao, Liang et al. "Noninvasive Imaging Beyond the Diffraction Limit of 3D Dynamics in Thickly Fluorescent Specimens" Cell 151, Dec. 7, 2012; pp. 1370-1385.
Gao, Liang "Optimization of the Excitation Light Sheet in Selective Plane Illumination Microscopy" Biomedical Optics Express; vol. 6, No. 3; Feb. 20, 2015; 10 pages.
Krzic, Uros et al. "Multi-View Light-Sheet Microscope for Rapid in Toto Imaging" Nature Methods; Jun. 2012.
Nikolenko, Volodymyr et al. "SLM Microscopy: Scanless Two-Photon Imaging and Photostimulation with Spatial Light Modulators" Frontiers in Neural Circuits, vol. 2, Article 5; Dec. 19, 2008 (14 pages).
Oxford Instruments "sCMOS Technology: What is sCMOS" available at https://andor.oxinst.com/learning/view/article/scmos-technology-what-is-scmos; 2019.
Planchon, Thomas A. et al., "Rapid Three-Dimensional Isotropic Imaging of Living Cells Using Bessel Beam Plane Illumination" Nature Methods; vol. 8, No. 5; May 2011;pp. 417-423.
Schmid, Benjamin et al. "High-Speed Panoramic Light-Sheet Microscopy Reveals Global Endodermal Cell Dynamics" Nature Communications; vol. 4, No. 2207; Jul. 25, 2013.
Silvestri, L., et al. "Confocal Light-Sheet Microscopy: Micron-Scale Neuroanatomy of the Entire Mouse Brain" Optics Express; vol. 20; No. 18; Aug. 27, 2012.
Swoger, Jim et al, "Multi-View Image Fusion Improves Resolution in Three-Dimensional Microscopy" Optics Express; vol. 15, No. 13; pp. 8029-8042; Jun. 25, 2007.
Tomer, Raju et al. "Quantitative High-Speed Imaging of Entire Developing Embryos with Simultaneous Multiview Light-Sheet Microscopy" Nature Methods; Jun. 3, 2012.
Vettenburg, T., et al. "Light Sheet Microscopy Using an Airy Beam" Natural Methods; vol. 11, No. 5; Apr. 2014.
Wu, Yicong, et al. "Spatially Isotropic Four-Dimensional Imaging with Dual-View Plane Illumination Microscopy" Nature Biotechnology; vol. 31, No. 11; 1032-1038; Nov. 2013.
Yu, Junjie et al. "Three Dimensional Dammann Array" Applied Optics; vol. 51, No. 10; pp. 1619-1630; Apr. 1, 2012.
Zong, Weijian et al. "Large-Field High-Resolution Two-Photon Digital Scanned Light-Sheet Microscopy" Cell Research; Sep. 2014.
International Search Report for corresponding International Application No. PCT/US14/28301, dated Aug. 7, 2014.
Written Opinion for corresponding International Application No. PCT/US14/28301, dated Aug. 7, 2014.
International Preliminary Report on Patentability for corresponding International Application No. PCT/US14/28301, dated Oct. 22, 2015.
International Search Report for International Application No. PCT/US2016/016545, dated Apr. 14, 2016.
Written Opinion for International Application No. PCT/US2016/016545, dated Apr. 14, 2016.
International Preliminary Report on Patentability for International Application No. PCT/US2016/016545, dated Aug. 17, 2017.
Partial Supplementary European Search Report for European Application No. 16747262.0, dated Sep. 10, 2018.
European Search Report for European Application No. 16747262.0, dated Dec. 19, 2018.
Office Action for U.S. Appl. No. 14/212,371, dated Aug. 4, 2015.
Office Action for U.S. Appl. No. 14/212,371, dated Feb. 12, 2016.
Office Action for U.S. Appl. No. 14/212,371, dated May 6, 2016.
Office Action for U.S. Appl. No. 14/212,371, dated Dec. 23, 2016.
Office Action for U.S. Appl. No. 14/212,371, dated Jul. 19, 2017.
Notice of Allowance for U.S. Appl. No. 14/212,371, dated Dec. 18, 2017.
Office Action for U.S. Appl. No. 15/015,494, dated Jul. 10, 2017.
Office Action for U.S. Appl. No. 15/015,494, dated Jan. 24, 2018.
Office Action for U.S. Appl. No. 15/015,494, dated May 22, 2018.
Office Action for U.S. Appl. No. 15/015,494, dated Jan. 4, 2019.
De Medeiros, Gustavo et al. "Confocal Multiview Light-Sheet Microscopy" Nature Communications; Published Nov. 25, 2015.
Hu, Bihe et al. "Improved Contrast in Inverted Selective Plane Illumination Microscopy of Thick Tissues Using Confocal Detection and Structured Illumination" Biomedical Optics Express; vol. 8, No. 12, Nov. 13, 2017.
International Search Report for corresponding International Application No. PCT/US2019/017624, dated May 17, 2019.

(56) References Cited

OTHER PUBLICATIONS

Written Opinion for corresponding International Application No. PCT/US2019/017624, dated May 17, 2019.
International Preliminary Report on Patentability for corresponding International Application No. PCT/US2019/017624, dated Aug. 27, 2020.

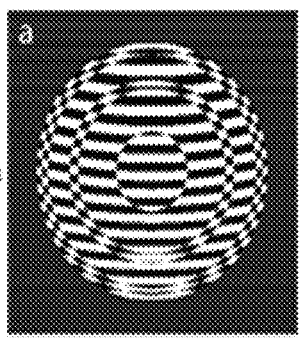
FIG. 4a
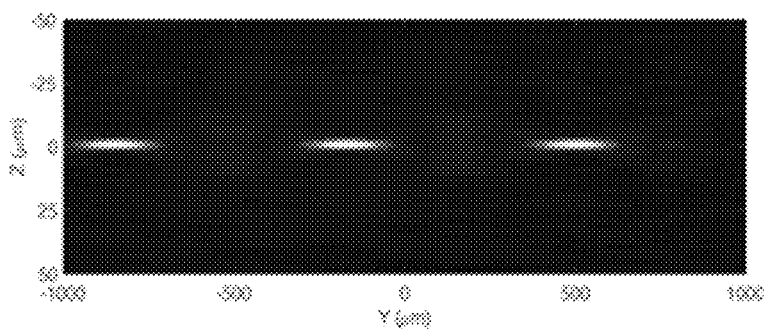
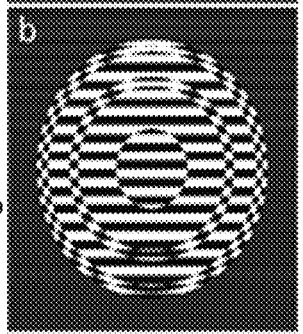
FIG. 4b
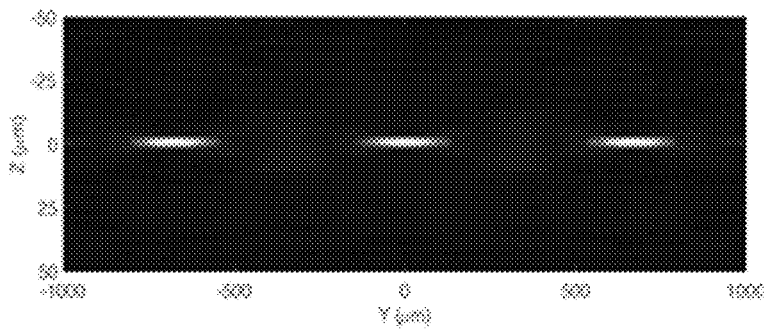
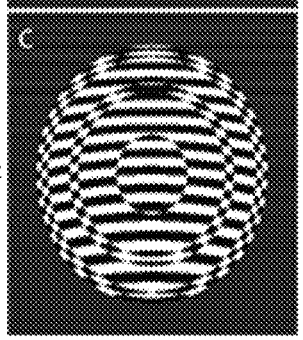
FIG. 4c
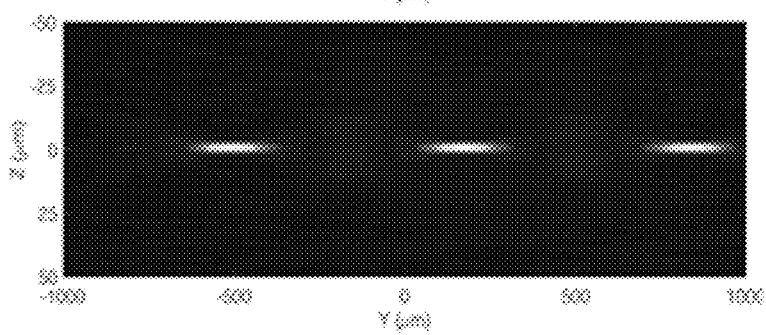

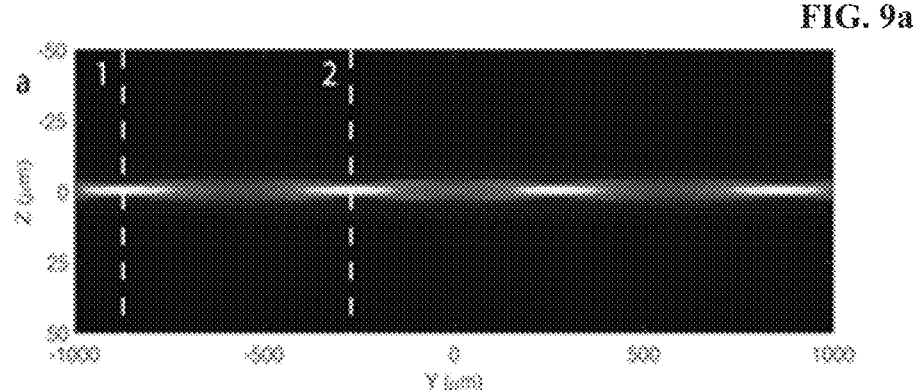
FIG. 9a
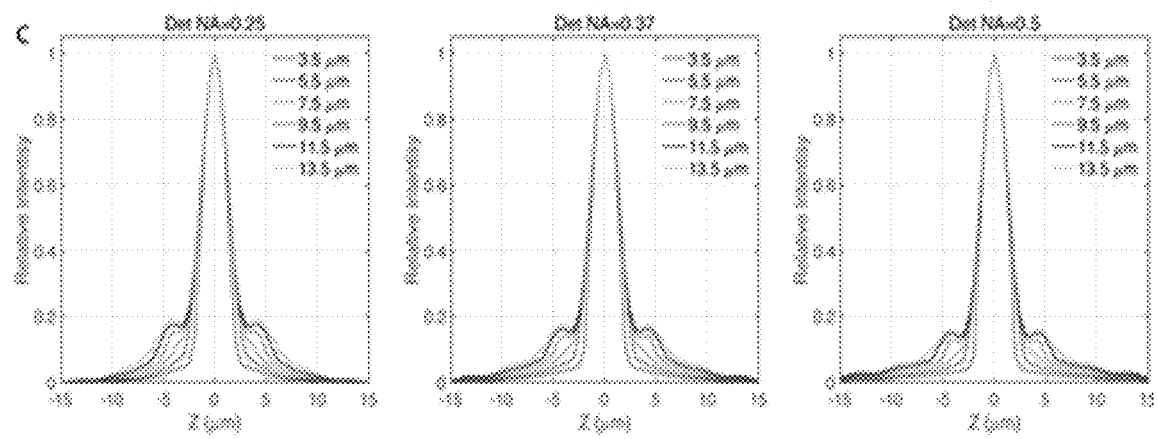
FIG. 9b
FIG. 9c

TILING LIGHT SHEET SELECTIVE PLANE ILLUMINATION MICROSCOPY USING DISCONTINUOUS LIGHT SHEETS

RELATED APPLICATION DATA

This application claims the benefit of and priority under 35 U.S.C. § 119(e) to U.S. Patent Application No. 62/629,405, filed Feb. 12, 2018, entitled "TILING LIGHT SHEET SELECTIVE PLANE ILLUMINATION MICROSCOPY USING DISCONTINUOUS LIGHT SHEETS," which is incorporated herein by reference in its entirety.

This application is also related to U.S. application Ser. No. 15/015,494, filed Feb. 4, 2016, entitled "ILLUMINATOR FOR MULTI-FOCUS CONFOCAL IMAGING AND OPTIMIZED FILLING OF A SPATIAL LIGHT MODULATOR FOR MICROSCOPY," and U.S. Pat. No. 9,952,418, issued Apr. 24, 2018, entitled MULTI-CHANNEL SIMULTANEOUS PHOTOSIMULATION," both of which are incorporated herein in their entirety.

OVERVIEW

Tiling light sheet selective plane illumination microscopy (TLS-SPIM) improves the 3D imaging ability of SPIM by using a real-time optimized tiling light sheet. However, the imaging speed decreases, and size of the raw image data increases proportionally to the number of tiling positions in TLS-SPIM. The decreased imaging speed and the increased raw data size could cause significant problems when TLS-SPIM is used to image large specimens at high spatial resolution. An exemplary aspect solves this problem. Discontinuous light sheets created by scanning coaxial beam arrays synchronized with camera exposures are used for 3D imaging to decrease the number of tiling positions required at each image plane without sacrificing the spatial resolution. One exemplary aspect investigates the performance of the method via numerical simulation and discuss the details thereof.

Introduction

A general overview of TLS-SPIM can be found in "Method and apparatus for tiling light sheet selective plane illumination microscopy with real-time optimized light sheet," filed Feb. 23, 2015, as WO 2016/138003A1, which is incorporated herein by reference in its entirety.

Descriptions of exemplary SPIM microscopy can be found in US 2015/0286042A1, WO 2014/005682A2, and WO 2013/053454A1 which are also incorporated herein by reference in their entirety.

The 3D imaging ability of selective plane illumination microscopy (SPIM), i.e. light sheet microscopy, relies on the intensity profile of the light sheet used for 3D imaging. The thickness, light confinement ability, and size of the light sheet determine the axial resolution, optical sectioning ability, and field of view (FOV) of SPIM respectively. [1,2] In order to improve the 3D imaging ability of SPIM on large specimens, tremendous efforts have been spent to optimize the light sheet intensity profile in the above aspects with one objective being the confining of the excitation light near the detection focal plane over a long distance as much as possible. [3-7]

Unfortunately, a fundamental trade-off exists among the above properties of a light sheet due to the diffraction of light. The excitation light is always less confined as the light sheet size increases, which makes it extremely difficult to image large specimens at high spatial resolution and signal-to-noise ratio (SNR) using SPIM. Methods other than optimizing the light sheet intensity profile were developed to solve the problem [8-13]. Among these methods, an effective approach is to quickly move the light sheet axially within the image plane during imaging, so that high spatial resolution and good optical sectioning ability can be maintained in a much larger FOV compared to the size of the light sheet itself [14-19]. Tiling light sheet selective plane illumination microscopy (TLS-SPIM) is a method using this strategy to improve the 3D imaging ability of SPIM on large specimens. [18,19]

In TLS-SPIM, a large field of view (FOV) is imaged by tiling a short but thin light sheet at multiple positions within the detection focal plane and taking a camera exposure at each light sheet tiling position. It has been demonstrated that TLS-SPIM is capable of imaging large multicellular specimens of different sizes, ranging from live embryonic specimens to cleared tissue specimens, at high spatial resolution. In addition, TLS-SPIM allows the optimization of the tiling light sheet intensity profile and the tiling position in milliseconds, so that the 3D imaging ability of the microscope can be optimized in real-time based on the biological specimen and process being imaged.

Despite the improved 3D imaging ability of TLS-SPIM, the additional camera exposures required in the light sheet tiling process cause major problems. The imaging speed decreases, and the size of the raw image data increases proportionally to the number of tiling positions, i.e., the number of camera exposures required per image plane. Although these problems are less of an issue when the number of tiling positions or sample size is small, it could be truly troubling when a large specimen needs to be imaged by TLS-SPIM at a high spatial resolution, which requires a large number of tiling positions per image plane.

For example, when TLS-SPIM is used to image a cleared tissue specimen of dozens of cubic millimeters at micron level spatial resolution, the total imaging time could be extended by a few hours or more compared to a conventional non-tiling condition, despite the improved spatial resolution. Meanwhile, hundreds of gigabytes, even several terabytes, of additional raw image data are created by the additional camera exposures, and must be collected, which produces a heavy burden to the often-limited data collection bandwidth and the data storage space.

One exemplary aspect presents a method to address at least the above problems of TLS-SPIM. Discontinuous tiling light sheets, created by scanning coaxial beam arrays that are synchronized with the rolling shutter of the detection sCMOS camera (Details of exemplary sCMOS technology can be found at https://andor.oxinst.com/learning/view/article/scmos-technology-what-is-scmos, which is also incorporated herein by reference in its entirety.), are used in TLS-SPIM to image a large FOV, by which the imaging speed of TLS-SPIM can be increased, and the raw image data size can be decreased proportionally to the number of the coaxial beams contained in the coaxial beam array. The primary feature of discontinuous light sheets is that they have multiple foci, or multiple regions of ideal sheet thickness. Here, one exemplary aspect presents the method and evaluates its performance via numerical simulations.

BRIEF DESCRIPTION OF THE FIGURES

For a more complete understanding of the present disclosure and its advantages, reference is now made to the following description taken in conjunction with the accompanying drawings, in which like reference numerals represent like parts:

FIG. 2a illustrates an exemplary field of view that can be imaged by tiling the same discontinuous light sheet at multiple positions. FIG. 2b illustrates an exemplary field of view that can be imaged by using multiple different discontinuous light sheets that compensate each other.

FIGS. 4a-c illustrate exemplary binary phase maps used to create and tile the same three beam coaxial beam array at different positions within the field of view. Excitation NAod=0.08, NAid=0.02.

FIGS. 9a-c illustrate exemplary YZ projection of the equivalent light sheet of the discontinuous light sheet of FIG. 6d with 7.5 μm confocal slit and 0.37 detection NA. (b) The intensity profile of the equivalent light sheet of the discontinuous light sheet 6d at position 1 with different confocal slit width and detection NA. (c) The intensity profile of the equivalent light sheet of the discontinuous light sheet 6d at position 2 with different confocal slit width and detection NA.

DESCRIPTION OF EMBODIMENTS

In order to increase the imaging speed of TLS-SPIM and produce less raw image data, the number of tiling positions and camera exposures must be decreased to image the same FOV. In other words, a larger effective area must be imaged at each light sheet tiling position with each camera exposure. Thus, the tiling light sheet must be enlarged along the light propagation direction. Meanwhile, the thickness and light confinement ability of the light sheet must remain the same to ensure that the same spatial resolution and optical sectioning ability can be maintained.

Using a "non-diffracting" light sheet, such as the Bessel light sheet or Lattice light sheet, is a possible solution to address the problem. However, the excitation light is still less confined by a "non-diffracting" light sheet when its size increases, which reduces the optical sectioning ability of SPIM significantly.

Figure 1:
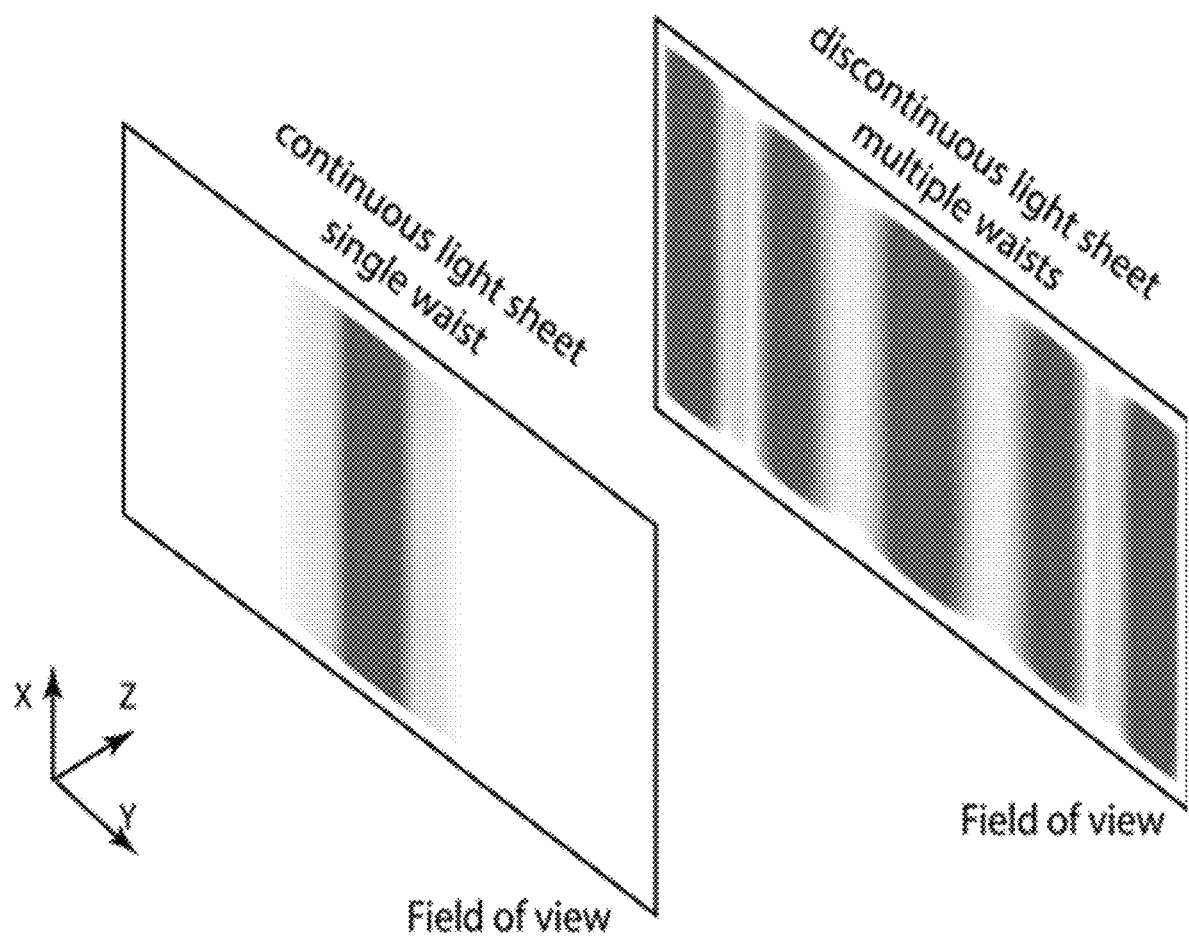
FIG. 1 illustrates an exemplary discontinuous light sheet with multiple waists which allows a larger area to be imaged at each tiling position compared to a continuous light sheet with a single waist, which improves the imaging speed and decreases the raw image data size of TLS-SPIM at the same time.
Figure 2A:
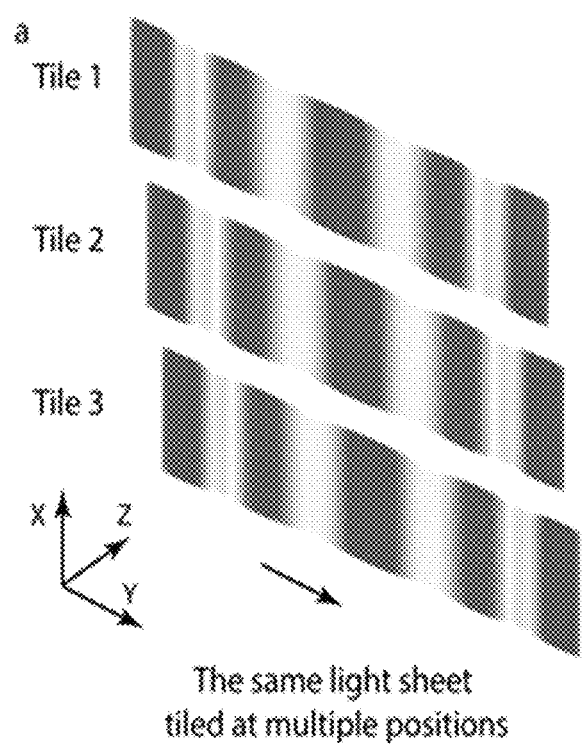
FIGS. 2a and 2b illustrate exemplary methods to implement discontinuous light sheets in TLS-SPIM for 3D imaging.
Figure 2B:
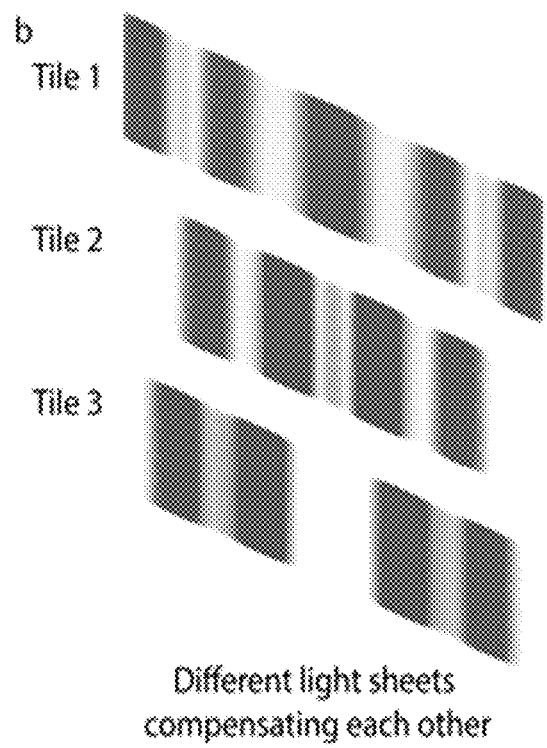
Figure 3A:
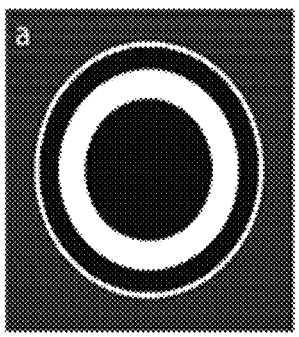
FIGS. 3a-c illustrate exemplary binary phase maps and the corresponding coaxial beam arrays that contain different number of beams and beam array periods. Excitation NAod=0.08, NAid=0.02.
Figure 3A:
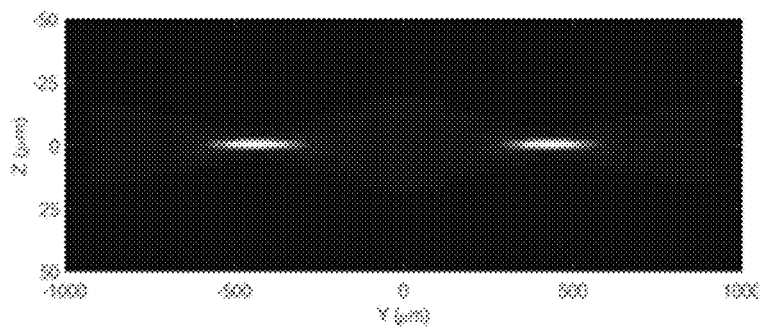
Figure 3B:
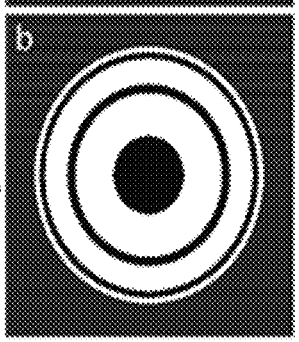
Figure 3B:
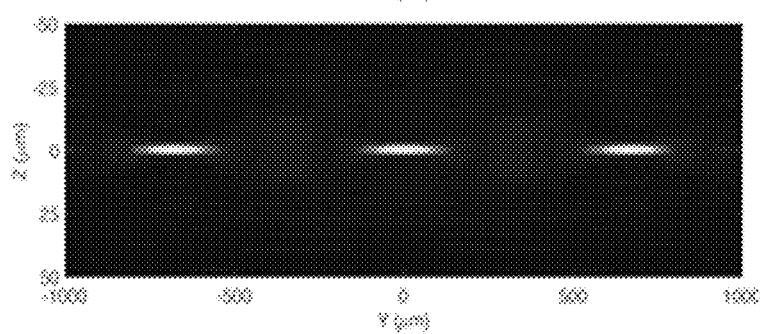
Figure 3C:
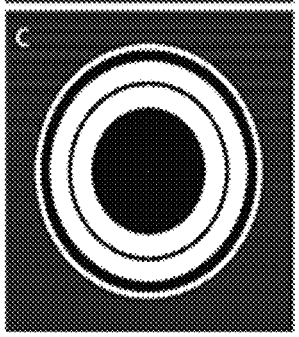
Figure 3C:
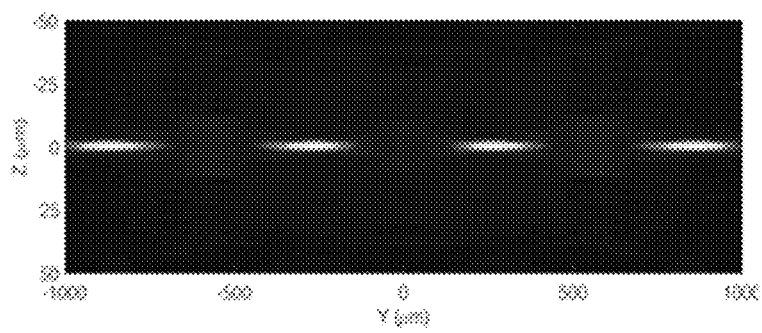
Figure 5A:
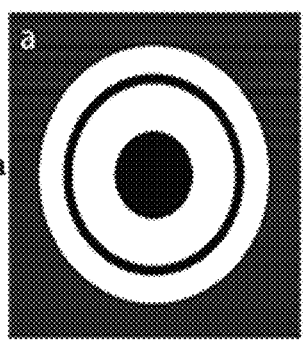
FIGS. 5a-c illustrate exemplary binary phase maps used to generate three different coaxial beam arrays with beam positions compensate with each other. Excitation NAod=0.08, NAid=0.02.
Figure 5A:
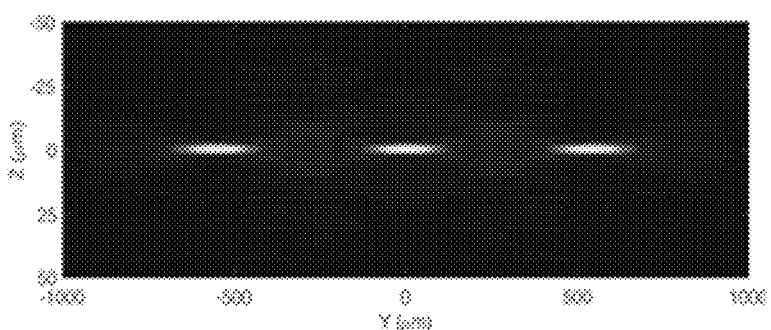
Figure 5B:
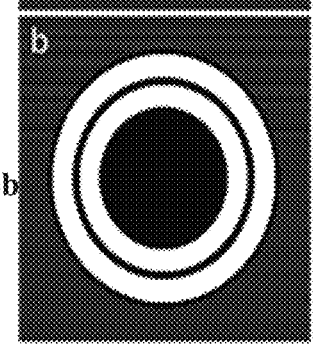
Figure 5B:
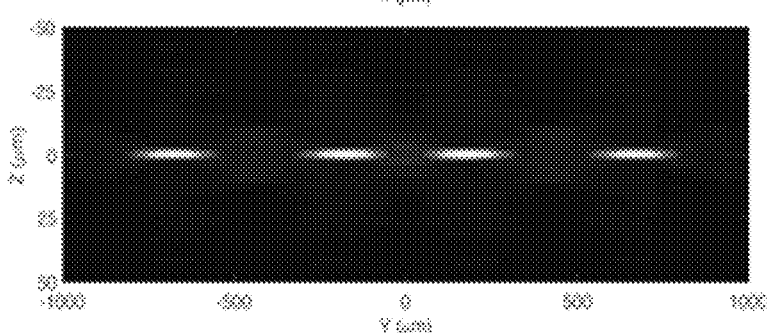
Figure 5C:
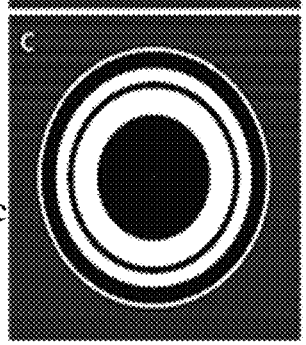
Figure 5C:
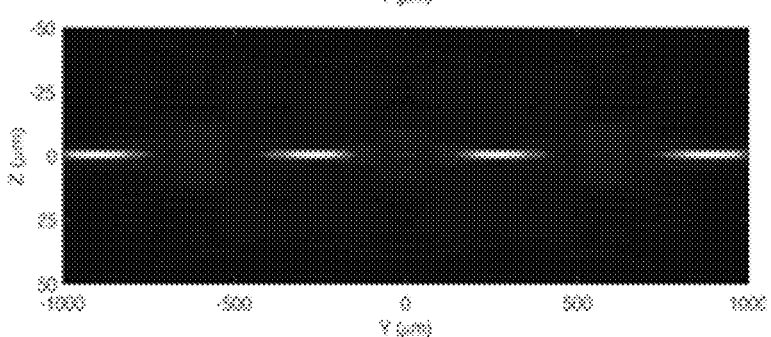

Therefore, one exemplary aspect presents a different approach to solve the problem. Instead of using a conventional light sheet with a continuous intensity profile, multiple light sheets that are separated far enough in the light propagation direction are used and tiled simultaneously for 3D imaging in TLS-SPIM. It can also be considered as using a discontinuous light sheet with multiple waists instead of a single continuous waist (FIG. 1), as the light sheet doesn't need to be continuous in TLS-SPIM. There are at least two ways to use discontinuous light sheets in TLS-SPIM for 3D imaging. First, the entire FOV can be imaged by tiling the same discontinuous light sheet at different positions in the FOV, which is the same as that in regular TLS-SPIM (FIG. 2a). Second, the entire FOV can be imaged by using multiple different discontinuous light sheets with different waist numbers and positions to compensate each other, by which the entire FOV can also be imaged after a few cycles (FIG. 2b).

An exemplary aspect investigates the optical designs to conduct the above operations in TLS-SPIM. In the TLS-SPIM microscope reported previously, either one or two binary SLMs are used to generate and tile light sheets of different dimensions for 3D imaging. Although the light sheet tiling process can also be realized by other optical devices, such as a focal variable lens, digital mirror device (DMD), deformable mirror, or a mechanical scanning device, the binary SLM has signification advantages compared to others due to its fast response speed, accurate phase modulation ability, control flexibility, robustness and the lack of mechanical movement. The only major disadvantage of the binary SLM is perhaps a relative low laser power efficiency caused by the undesired diffraction orders generated by the device, which can be easily solved by using a high power laser source. Thus, an exemplary embodiment operates with optical designs using binary SLMs to implement discontinuous light sheets in TLS-SPIM.

A discontinuous light sheet can be obtained by scanning a coaxial beam array, and the effective size of such a discontinuous light sheet is proportional to the number of coaxial beams contained in the beam array. A coaxial beam array can be created easily by adding a DOE (Diffractive Optical Element) element into the previous TLS-SPIM system at a plane conjugated to the rear pupil of the excitation objective, and the binary SLM can be used as a focal variable device to tile the coaxial beam array, so as to the discontinuous light sheet.

However, a DOE element can only generate a coaxial beam array with a fixed beam number and period, which reduces the flexibility of TLS-SPIM significantly. In addition, a DOE element usually works differently for different excitation wavelengths, which makes it difficult to maintain the same imaging quality for different excitation wavelengths. Therefore, an exemplary aspect introduces solutions to generate coaxial beam arrays using the binary SLM used in TLS-SPIM, so that the microscope can generate coaxial beam arrays of different beam numbers and periods for different excitation wavelengths, tile the beam array, and switch between different beam arrays quickly to optimize the imaging performance.

Methods of generating coaxial beam arrays using binary optical devices have been studied extensively. A method that is modified from the designing of Dammann gratings was developed in our research to generate binary phase maps for the binary SLM to create coaxial beam arrays of different dimensions [20]. As shown in FIG. 3, coaxial beam arrays including 1 to 4 Gaussian beams (0.07 excitation NA) with different beam array periods were generated by applying different binary phase maps to a binary SLM. Nevertheless, the choices of the beam array periods and beam numbers are still limited due to the limited resolution of the binary SLM, despite it being much more flexible than a fixed DOE element.

Next, the coherent beam array needs to be tiled along the light propagation direction to image the entire FOV. As discussed above, there are two ways to perform the light sheet tiling process. One is to tile the same coaxial beam array at different positions in the same way as that in regular TLS-SPIM. It can be achieved by superimposing a tilted spherical phase to the circular Dammann grating used to generate the coaxial beam array and resetting the phase values to 0 and $\pi$ (FIG. 4). A similar tiling process can also be realized by moving the sample if the specimen is fixed and the imaging speed is not a concern. Otherwise, moving the sample is generally less preferred in most applications.

Instead of tiling the same light sheet, another way to image the entire FOV in TLS-SPIM is to use multiple discontinuous light sheets with different waist positions, that compensate each other. For example, a FOV can be imaged by using three discontinuous light sheets, which are created by scanning a five-beam coaxial beam array, and two, four-beam arrays, respectively (FIG. 5). An additional exemplary advantage of the method is that more diffraction orders created by the binary SLM are used for imaging, so that the laser efficiency is improved significantly compared to the previous method.

Nevertheless, the excitation coaxial beam array needs to be scanned to create a virtual discontinuous light sheet at each tiling position, while the crosstalk between different beams of a coaxial beam array causes a problem when the beam array is scanned to create a discontinuous light sheet. The off-focus light of the beam array adds up together during the beam scanning process and introduces additional off-focus excitation at the waist positions of the discontinuous light sheet, which is the same as what happens in a "non-diffracting" light sheet. Obviously, the additional off-focus excitation reduces the optical sectioning capability of the microscope. As shown FIG. 6, the off-focus excitation energy increases as the beam array period decreases and the beam number increases. Indeed, the diffraction of light always dominates the tradeoff between the thickness, light confinement ability and size of the light sheet. The light confinement ability of a light sheet decreases as the usable portion of the light sheet increases, regardless the exact intensity profile. Despite the similarity between a discontinuous light sheet and a "non-diffracting" light sheet, that both of them extend the usable portion of a light sheet by sacrificing the excitation light confinement ability, there is a significant difference between them—the distribution of the unconfined excitation light outside the detection focal plane. FIG. 6 and FIG. 7 show the intensity profile differences between discontinuous light sheets and Bessel light sheets that are capable of imaging the same FOV at the same theoretical axial resolution. As shown, the off-focus excitation light is spread much further from the detection focal plane in discontinuous continuous light sheets created by scanning a coaxial beam array compared to the Bessel light sheets.

A series of images are taken with each image corresponding to a specific discontinuous beam pattern. The part of each image where the beam has a tight waist is then kept while the rest of the image is digitally removed. Because the beam waists are swept across the field, the kept part of each image will be several discontinuous slits. These several kept parts of each image are combined to form a complete image. Effectively this is a digital slit in the direction of the beam.

In light sheet microscopy, the off-focus fluorescence background produced by a virtual light sheet created by a scanning beam can be suppressed by using a sCMOS camera for fluorescence detection and operating the sCMOS camera in the light sheet readout mode [21,22]. In the light sheet readout mode of a sCMOS camera, the exposure and readout of each pixel row is synchronized with the scanning coaxial beam array, which results in a slit confocal detection effect rather than the wide field detection in normal light sheet microscopy, so that the majority of the fluorescence background created by the off-focus excitation light is rejected by the camera. Obviously, the off-focus fluorescence background created by discontinuous light sheets can be rejected much easier because the confocal slit detection is more effective in rejecting the fluorescence background that is further away from the detection focal plane.

Next, we studied the effectiveness of the confocal slit detection in rejecting the off-focus fluorescence background created by discontinuous light sheets with different detection numerical apertures (NA) and the confocal slit widths. FIG. 8-9 show the simulated equivalent light sheet intensity profile of the discontinuous light sheets in FIG. 6 with 3.5-13.5 confocal slit detection at 0.25, 0.37 and 0.5 detection. We also simulated the equivalent light sheet intensity profiles of Bessel light sheets in FIG. 7 that offer comparable theoretical spatial resolution and FOV. Clearly, the confocal slit detection is an effective method to suppress the off-focus fluorescence background. It behaves very similarly with different detection NA, but thinner confocal slits reject the off-focus background much more effectively. Meanwhile, it is obvious that the further the off-focus background is away from the detection focal plane, the more the background is suppressed by the confocal slit detection, which is a key advantage of the discontinuous light sheet over "non-diffracting" light sheets, such as the Bessel light sheet. As a result, a large area can be imaged at each tiling position in TLS-SPIM using discontinuous light sheets together with confocal slit detection, by which the imaging speed of TLS-SPIM can be increased and the size of raw image data can be decreased with little loss on the optical sectioning capability.

Figure 6A:
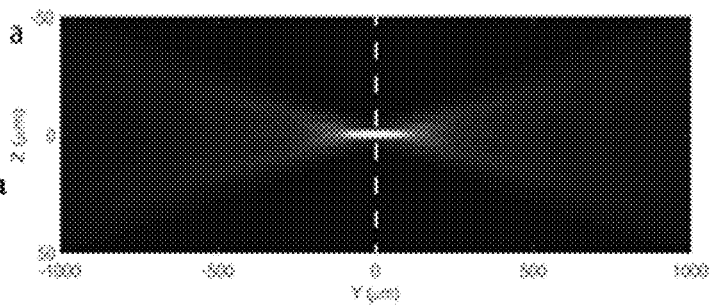
FIGS. 6a-d illustrate exemplary YZ max projections and the intensity profiles of discontinuous light sheets created by scanning coaxial beam arrays that contain two to four coaxial beams. Excitation NAod=0.08, NAid=0.02.
Figure 6A:
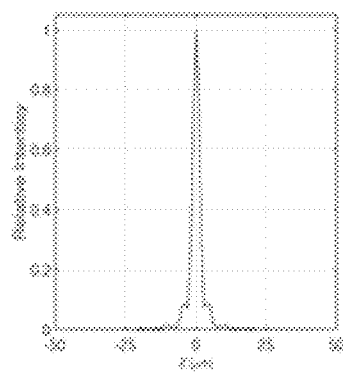
Figure 6B:
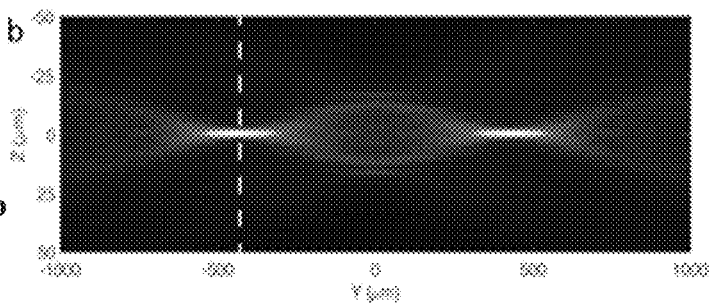
Figure 6B:
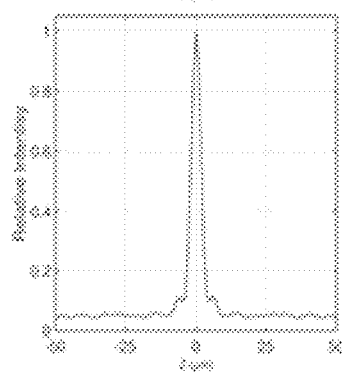
Figure 6C:
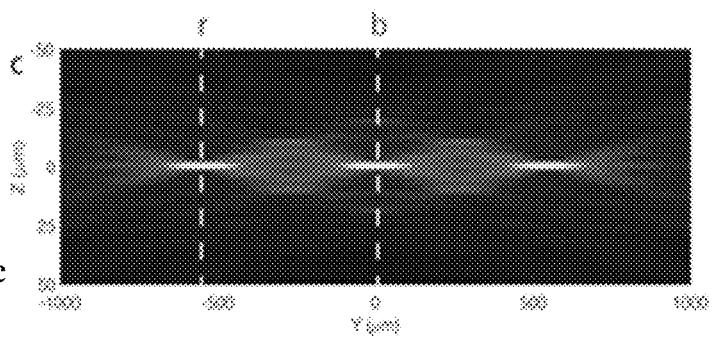
Figure 6C:
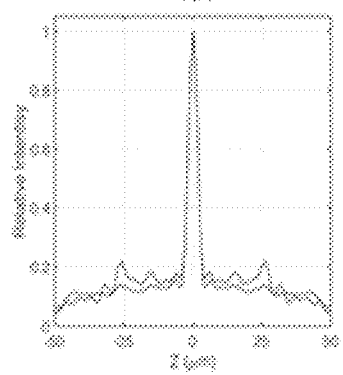
Figure 8A:
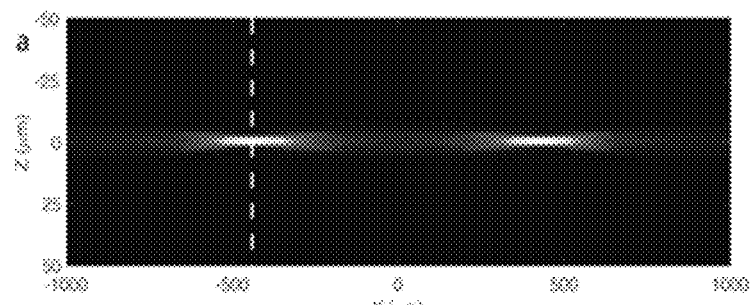
FIGS. 8a-e illustrate exemplary equivalent light sheets of the discontinuous light sheets 6b and 6c with confocal slit detection.
Figure 8B:
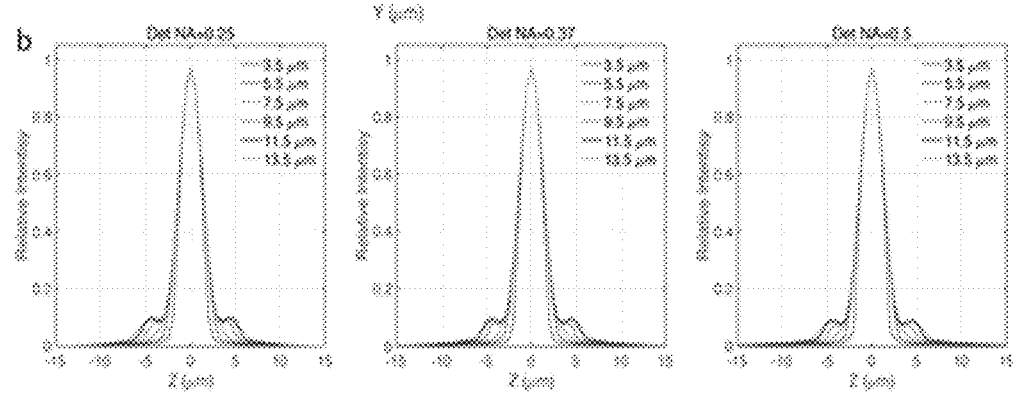
Figure 8C:
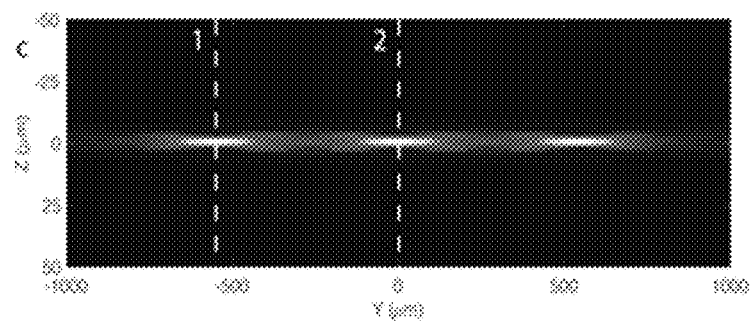
Figure 8D:
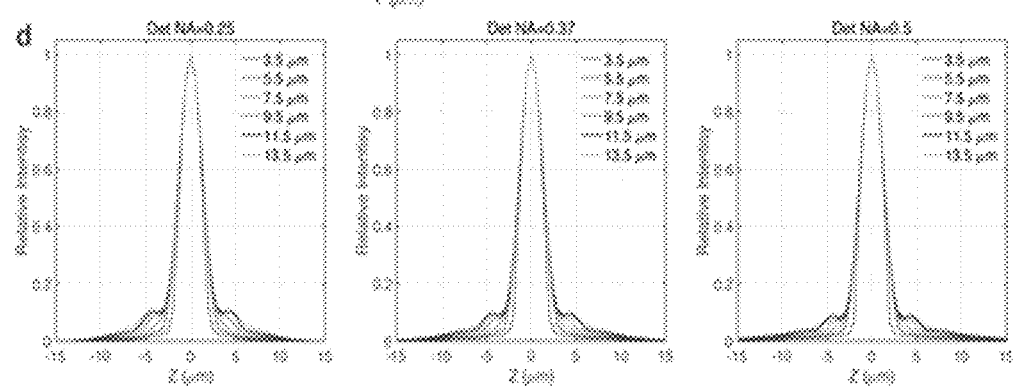
Figure 8E:
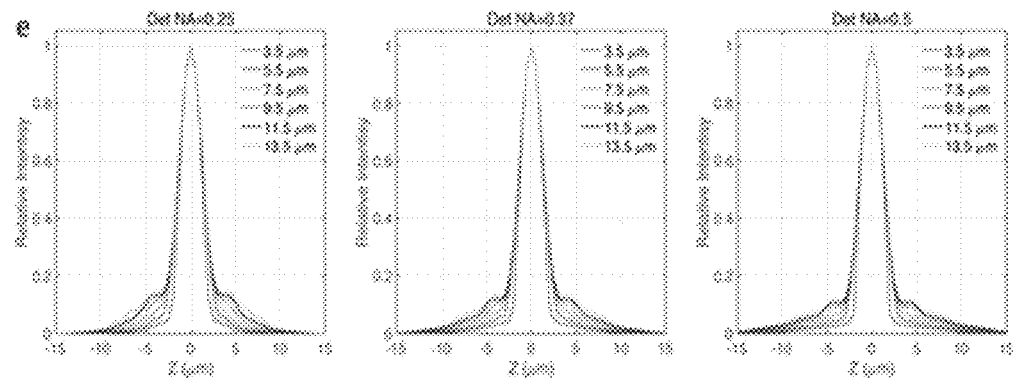
Figure 10A:
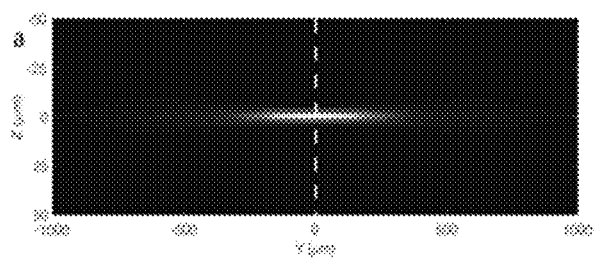
FIGS. 10a-f illustrate exemplary equivalent light sheets of the Bessel light sheets of FIGS. 7b, 7c and 7d with confocal slit detection.
Figure 10B:
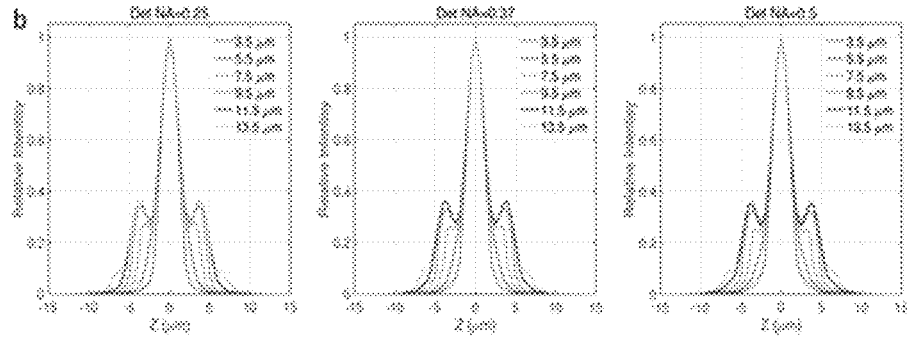
Figure 10C:
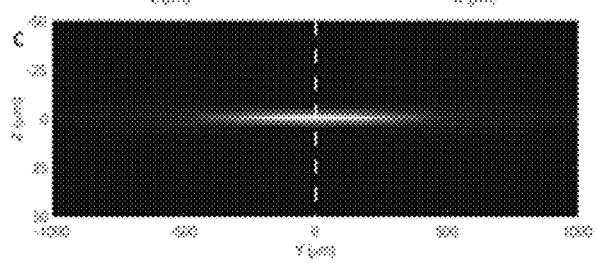
Figure 10D:
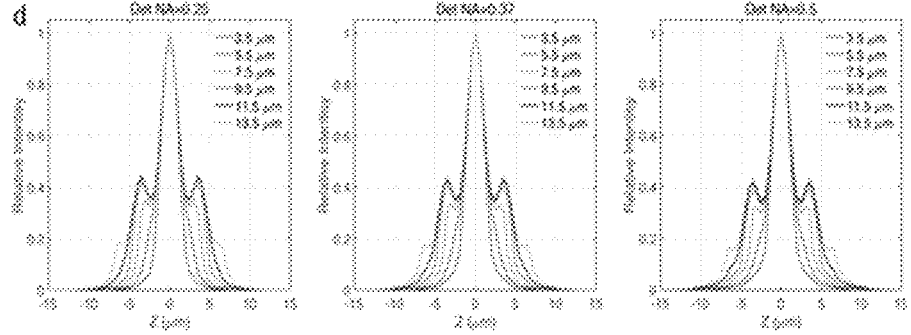
Figure 10E:
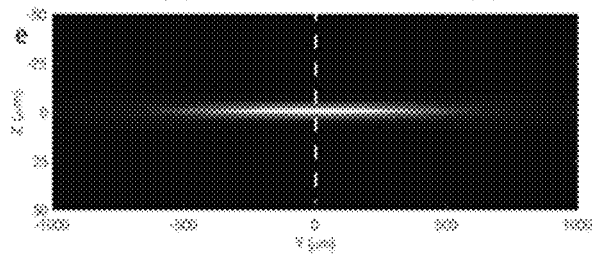
Figure 10F:
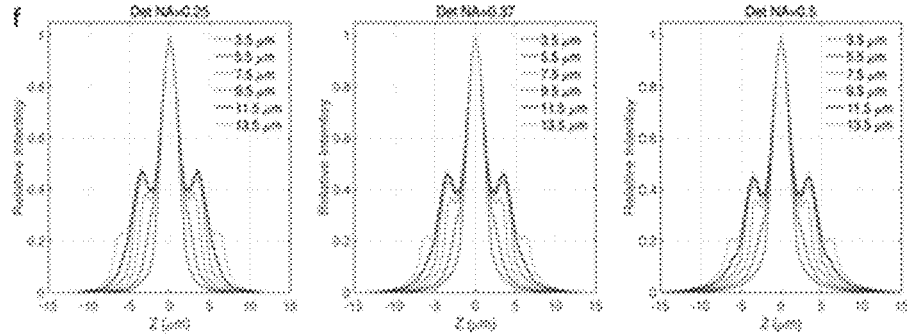

FIGS. 8a-e illustrate exemplary equivalent light sheets of the discontinuous light sheets from FIGS. 6b and 6c with confocal slit detection. FIG. 8a shows the YZ projection of the equivalent light sheet of the discontinuous light sheet of FIG. 6b with 7.5 μm confocal slit and 0.37 detection NA. FIG. 8b shows the intensity profile of the equivalent light sheet of the discontinuous light sheet of FIG. 6b with different confocal slit width and detection NA. FIG. 8c shows the YZ projection of the equivalent light sheet of the discontinuous light sheet of FIG. 6c with 7.5 μm confocal slit and 0.37 detection NA. FIG. 8d shows the intensity profile of the equivalent light sheet of the discontinuous light sheet of FIG. 6c at position 1 with different confocal slit width and detection NA. FIG. 8e shows the intensity profile of the equivalent light sheet of the discontinuous light sheet of FIG. 6c at position 2 with different confocal slit width and detection NA.

Figure 6D:
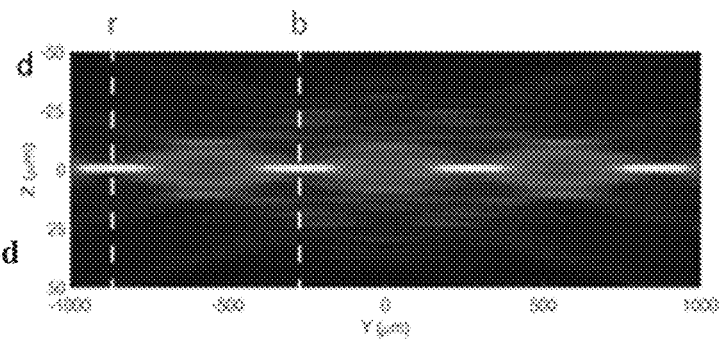
Figure 6D:
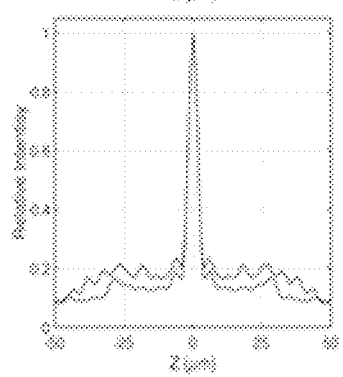

FIGS. 9a-c illustrate exemplary YZ projections of the equivalent light sheet of the discontinuous light sheet of FIG. 6d with 7.5 μm confocal slit and 0.37 detection NA. FIG. 9b shows the intensity profile of the equivalent light sheet of the discontinuous light sheet of FIG. 6d at position 1 with different confocal slit width and detection NA. FIG. 9c shows the intensity profile of the equivalent light sheet of the discontinuous light sheet of FIG. 6d at position 2 with different confocal slit width and detection NA.

Figure 7A:
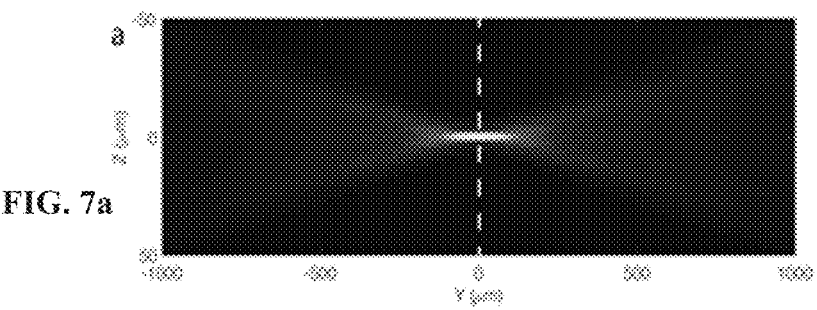
FIGS. 7a-d illustrate exemplary YZ max projections and the intensity profiles of Bessel light sheets that offer comparable field of view and axial resolution to the discontinuous light sheet in FIG. 6. Excitation NA=0.08, NAid=0.02 in a, NAod=0.08, NAid=0.057 in b, NAod=0.08, NAid=0.065 in c and NAod=0.08, NAid=0.069 in d.
Figure 7A:
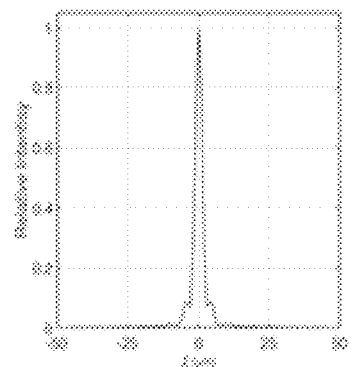
Figure 7B:
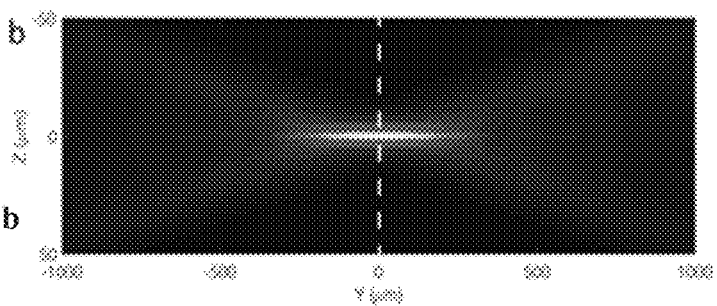
Figure 7B:
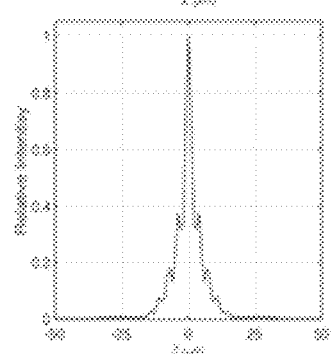
Figure 7C:
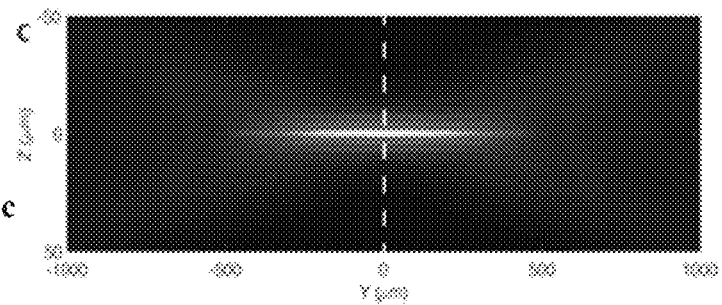
Figure 7C:
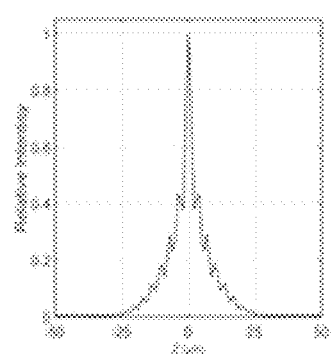
Figure 7D:
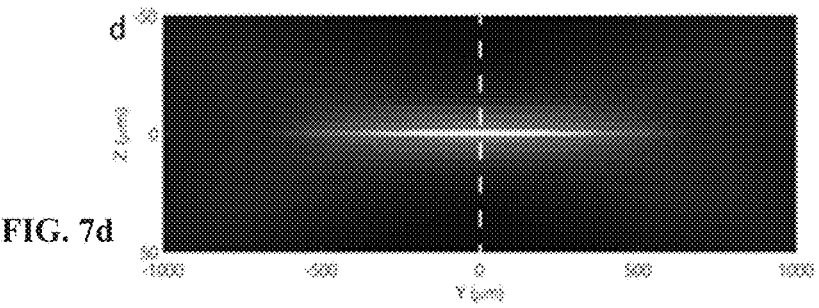
Figure 7D:
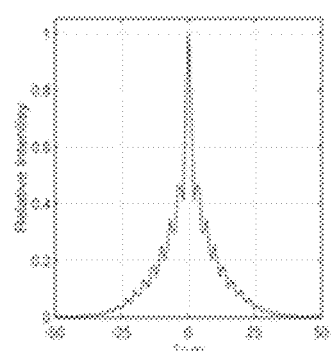

FIG. 10 shows equivalent light sheets of the Bessel light sheets of FIGS. 7b, 7c and 7d with confocal slit detection. FIG. 10a shows the YZ projection of the equivalent light sheet of the Bessel light sheet 7b with 7.5 μm confocal slit and 0.37 detection NA. FIG. 10b shows the intensity profile of the equivalent light sheet of the Bessel light sheet of FIG. 7b with different confocal slit width and detection NA. FIG. 10c shows the YZ projection of the equivalent light sheet of the Bessel light sheet of FIG. 7c with 7.5 μm confocal slit and 0.37 detection NA. FIG. 10d shows the intensity profile of the equivalent light sheet of the Bessel light sheet of FIG. 7c with different confocal slit width and detection NA. FIG. 10e shows the YZ projection of the equivalent light sheet of the Bessel light sheet of FIG. 7d with 7.5 μm confocal slit and 0.37 detection NA. FIG. 10f shows the intensity profile of the equivalent light sheet of the Bessel light sheet of FIG. 7d with different confocal slit width and detection NA.

An exemplary aspect is therefore directed toward a method to increase the imaging speed and decrease the raw data size of TLS-SPIM. Discontinuous lights sheets created by scanning coaxial beam arrays synchronized with the camera exposure are used for 3D imaging. We studied the method and evaluated its performance via numerical simulations. We showed that the implementation of discontinuous light sheets together with the confocal slit detection mode in TLS-SPIM allow the same FOV being imaged with less light sheet tiling positions, i.e., camera exposures, while maintain the same spatial resolution and optical sectioning ability. The new method can improve the imaging speed and reduce the image data size by several times, which could bring significant benefits when TLS-SPIM is used to image large specimens at high spatial resolution.

Figure 11:
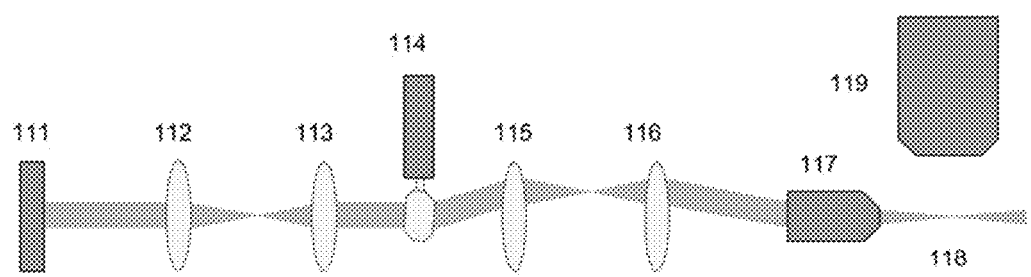
FIG. 11 illustrates an exemplary microscopy environment in accordance with an exemplary embodiment.

FIG. 11 illustrates an exemplary microscope environment usable with the described technology. FIG. 11 includes an SLM 111, lenses 112-113, galvanometer 114, lenses 115-116, and objective 117. The sample is 118 and a second objective is 119.

In FIG. 11, the excitation beam is modified by an SLM or similar device 111. The image from the SLM is relayed using lenses 112 and 113 to a galvanometer 114. The galvanometer is used to sweep the beam in one direction which form a sheet. The image on the galvanometer is relayed with lenses 115 and 116 to the back aperture of objective 117. This forms a beam waist at the sample 118. This sample is then imaged with another objective 119. The focus location of the beam waist is modified by the SLM to have multiple waists than can be shifted as discussed herein.

Exemplary aspects are directed toward:

A selective plane illumination microscopy (SPIM) device that uses a discontinuous light sheet, in which the intensity profile of the illumination beam along the direction of the illumination beam is not continuous consisting of:
a SPIM imaging system,
a modified SPIM illumination beam that is discontinuous.

Any of the above aspects in which the illumination beam has more than one beam waists that provide more than one useful sheets along the direction of the illumination beam.

Any of the above aspects in which the beam waists are generated using Bessel beams.

Any of the above aspects in which the more than one beam waists are generated using a spatial light modulator (SLM).

Any of the above aspects in which the more than one beam waists are generated using a phase plate.

Any of the above aspects in which the microscope can also perform tiling light sheet selective plane illumination microscopy (TLS-SPIM).

Any of the above aspects in which TLS-SPIM is performed by adding an additional SLM to the illumination path.

Any of the above aspects in which TLS-SPIM is performed by using a variable optic.

Any of the above aspects in which the device can tile a light sheet at discrete positions to image regions of interest in the same image plane in TLS-SPIM.

Any of the above aspects in which the microscope uses different discontinuous light sheets that compensate each other in TLS-SPIM.

Any of the above aspects in which the detection path has a slit or slits to confine the detected signal to the beam waists of the illumination beam. As the beam waists are moved, said slits move with said beam waists.

Any of the above aspects in which the means for generating the slit(s) is digitally done by processing the raw images.

Any of the above aspects in which the means for generating the slit(s) is done by selectively reading the pixels of the detection device.

Any of the above aspects in which the detection path has a slit or slits to confine the detected signal to the scanned beam. As the beam is scanned across the field, said slit or slits move with the scanned beam.

Any of the above aspectsin which the means for generating the slit(s) is digitally done by processing the raw images.

Any of the above aspectsin which the means for generating the slit(s) is done by selectively reading the pixels of the detection device.

Any of the above aspectsin which an additional slit or slits is added to the detection path to confine the detected signal to the scanned beam.

The exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a microscope optionally in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a microscope or microscope system, any comparable means, or the like. In general, any device capable of implementing a state machine that is in turn capable of implementing the methodology illustrated herein can benefit from the various methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel®

Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, microscope, imaging or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The systems, methods and protocols illustrated herein can be readily implemented in hardware and/or software using any known or later developed systems or structures, devices and/or software by those of ordinary skill in the applicable art from the functional description provided herein and with a general basic knowledge of the computer and imaging arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, imaging system, microscopy imaging system, or the like. In these instances, the systems and methods can be implemented as program embedded on personal computer such as an applet, JAVA™ or CGI script, as a resource residing on a server or computer workstation, as a routine embedded in a dedicated imaging system or system component, or the like. The system can also be implemented by physically incorporating the system and/or method into a software and/or hardware system, such as the hardware and software systems of an imaging system or microscope system.

Furthermore, the disclosed control methods may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with various embodiments an improvement to selective plane illumination microscopy. While aspects have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A Selective Plane Illumination Microscopy (SPIM) device comprising:
    an illumination source that generates an illumination beam;
    a discontinuous light sheet, wherein an intensity profile of the illumination beam along a direction of the illumination beam is not continuous, wherein the illumination beam has more than one beam waists that provide more than one light sheet along the direction of the illumination beam, and wherein the more than one beam waists are simultaneously generated;
    a SPIM imaging system; and
    a modified SPIM illumination beam that is discontinuous.

2. The device of claim 1, wherein the beam waists are generated using Bessel beams.

3. The device of claim 1, wherein the more than one beam waists are generated using a spatial light modulator (SLM).

4. The device of claim 1, wherein the more than one beam waists are generated using a phase plate.

5. The device of claim 1, wherein the device performs tiling light sheet selective plane illumination microscopy (TLS-SPIM).

6. The device of claim 5, wherein TLS-SPIM is performed by adding an additional SLM (Spatial Light Modulator) to the illumination path.

7. The device of claim 5, wherein TLS-SPIM is performed by using a variable optic.

8. The device of claim 5, wherein the device tiles a light sheet at discrete positions to image regions of interest in the same image plane in TLS-SPIM.

9. The device of claim 5, wherein the device uses different discontinuous light sheets that are offset from one another along a first direction in TLS-SPIM.

10. The device of claim 1, wherein a detection path has a slit or slits to confine a detected signal to the beam waists of the illumination beam, further wherein as the beam waists are moved, the slits move with the beam waists.

11. The device of claim 10, wherein the slit(s) are generated digitally by processing raw images.

12. The device of claim 10, wherein the slit(s) are generated by selectively reading pixels of the detection device.

13. The device in claim 1, wherein the detection path has a slit or slits to confine the detected signal to the scanned beam, and as the beam is scanned across a field, the slit or slits move with the scanned beam.

14. The device of claim 13, wherein the slit(s) are generated digitally by processing raw images.

15. The device of claim 13, wherein the slit(s) are generated by selectively reading pixels of the detection device.

16. The device in claim 10, wherein an additional slit or slits is added to the detection path to confine the detected signal to the scanned beam.

17. A Selective Plane Illumination Microscopy (SPIM) device comprising:
    means for generating an illumination beam;
    means for providing a discontinuous light sheet, wherein an intensity profile of the illumination beam along a direction of the illumination beam is not continuous, wherein the illumination beam has more than one beam waists that provide more than one light sheet along the direction of the illumination beam, and wherein the more than one beam waists are simultaneously generated;

means for imaging; and a modified SPIM illumination beam that is discontinuous.

18. The device of claim 17, wherein the discontinuous light sheet is created by scanning coaxial beam arrays synchronized with a camera exposure in 3D imaging.

* * * * *